United States Patent Office 2,773,015
Patented Dec. 4, 1956

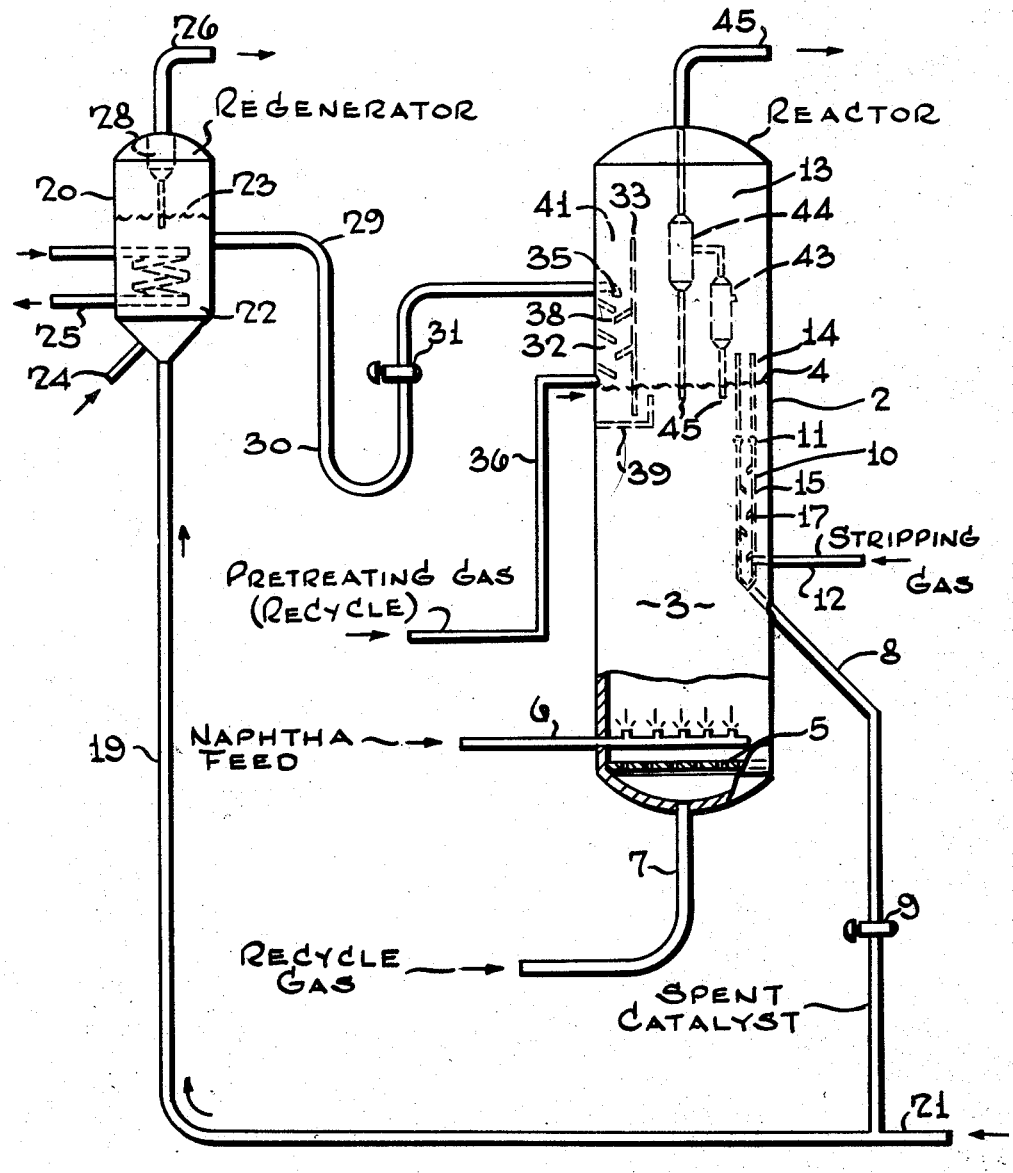

2,773,015

FLUID HYDROFORMING PROCESS

Richard J. Yoder, Elizabeth, N. J., assignor to Esso Research and Engineering Company, a corporation of Delaware Application April 30, 1952, Serial No. 285,146

3 Claims. (Cl. 196—50)

This invention relates to the catalytic conversion of hydrocarbons and more particularly to a process for the catalytic hydroforming of naphthas using a fluidized solid catalyst.

Catalytic hydroforming is a well-known and widely used process for treating hydrocarbons in the naphtha boiling range to convert them to more useful products, having ordinarily a higher content of aromatic hydrocarbons. The process has been used specifically to produce pure aromatic hydrocarbons, and has recently become a major source for synthetic benzene, toluene and the xylenes. In addition to such uses where it has been employed as a major source for pure aromatics, it has been employed for the preparation of various aromatic concentrates such, for example, as solvents or motor fuel blending agents. Another major use of the catalytic hydroforming process has been in the conversion of broad range naphtha cuts, into motor fuels of greatly improved anti-knock and volatility characteristics. The process has been particularly important in this connection because of the facility with which it can be used in converting products having relatively poor motor fuel characteristics into products of premium quality.

The catalytic hydroforming process consists essentially of a method for treating hydrocarbon vapors with a highly active conversion catalyst in the presence of a hydrogen atmosphere, which helps to suppress side reactions leading to coke formations and promotes conversion reactions which result in no net hydrogen consumption. The catalysts employed for this process include a variety of group IV to group VIII metals, their oxides or sulfides, supported ordinarily on a catalyst carrier. Particularly useful results have been found with the oxides of group VI metals of variable valence such as molybdenum, chromium or tungsten, commonly supported on an adsorbent material such as active alumina or zinc aluminate.

Catalytic hydroforming is a strongly endothermic process. While the degradation of feed stock to carbon on the catalyst is kept to a minimum during the process, the removal of this deposit by oxidative regeneration represents an important source of heat to supply the necessary heat of reaction. The fluidized solids technique has been found to be particularly useful in handling the solid catalyst in this reaction. Among the advantages which this technique presents in this process may be mentioned:

(1) It maintains a uniform temperature within the bed, preventing the development of hot spots or cold spots.

(2) It facilitates the transfer of heat from regeneration to the conversion process, either as sensible heat of the catalyst or by heat transfer to and from the fluidized catalyst particles across a confining wall.

(3) Reaction, regeneration and catalyst handling zones can be economically designed for a single function.

(4) The regeneration or reconditioning of the catalyst may be readily controlled.

With the highly active hydroforming catalysts described above, it has been frequently found that the highest activity is associated with an intermediate state of oxidation of the catalytic metal. In the alternating cycle described, the catalyst passes from a reducing atmosphere in the conversion zone to an oxidizing atmosphere in the regeneration zone. Experience has shown that the catalyst in this cycle is quite readily oxidized too far during regeneration, and that a completely oxidized catalyst does not give as good a product or as high yields as one which is partly reduced. On the other hand, the freshly regenerated catalyst is so highly active that any process for its reduction must be carefully controlled to prevent overheating and over-reduction. Both the oxidation and reduction reactions are exothermic and proceed more rapidly at higher temperature, so that temperature control becomes both more desirable and more difficult when conditions are such that over-reduction can occur.

Since some reduction of the freshly regenerated catalyst is desired, it has previously been proposed to contact the freshly regenerated catalyst with a stream of hydrogen-containing gas in a separate treating or stripping vessel. This serves the double function of removing occluded regeneration gas and causing a partial reduction of the catalytic oxide. The cost of such a separate treating vessel is found to be an important item of expense in plant designs. Other proposals have been made for the treatment of the regenerated catalyst in a dilute suspension in a high velocity gas stream, which passes to a separator to recover the treated catalyst and treating gas. Here again, the construction of the gas separator equipment requires an expensive special vessel. If such a stream is passed directly into the hydroforming reactor to employ the separating equipment at that stage, it adds additional gas to the total product stream, thereby limiting the capacity of the reactor itself.

Still other proposals have introduced the stripping gas and stripped catalyst directly into the fluid bed within the hydroforming reaction vessel. In this type of operation the stripping gas, which contains a relatively large amount of hydrogen, becomes part of the hydrogen-containing atmosphere in the reaction zone. Unfortunately, the stripping and pretreating operations in which this hydrogen-containing gas is brought into contact with the completely oxidized regenerated catalyst result in the production of moisture. This moisture is partly desorbed and occluded water vapor from the regeneration process. In addition, however, the partial reduction of the oxide itself produces additional moisture. Water vapor has a definitely harmful effect with many molybdena catalysts. With any catalyst which is water sensitive, therefore, it is very desirable to avoid putting this stripping gas back into the system at any point where it will come into contact with the main reaction bed. On the other hand, efficient stripping action requires some process for bringing the gas into intimate contact with the catalyst particles. Since over-reduction is to be avoided, this means that a limited time of contact between the regenerated catalyst and stripping gas is desirable. In dealing with a finely divided catalyst this means that the velocity of the stripping gas will ordinarily be such that there will be some catalyst entrainment. Some suitable provisions must also be made, therefore, to recover this entrained catalyst from the stripping gas.

According to the present invention, a simple means is provided for pretreating a regenerated hydroforming catalyst in a portion of the main reaction zone without bringing the treating gas into contact with the main catalyst bed. An important advantage of the process as described is that it effects maximum utilization of a given amount of stripping gas, by passing the freshly regenerated catalyst in counter-current flow to a rising gas stream introduced in such a manner that the stripping gas is at all times above the bed level in the reactor. Thus, only stripped catalyst enters the bed. This process also minimizes the contact between stripping gas and the main body catalyst undergoing the hydroforming reaction, and saves the cost of separate vessels or the extra gas-solid separating equipment required when high velocity stripping gas streams are employed with co-current solid-gas flow. As a still further advantage, those catalyst particles which have been entrained and therefore kept in contact with the stripping gas for the longest time are here returned to the catalyst bed, and not to the stripping zone. This materially reduces the likelihood that these particular particles will be over-reduced by recontacting them with the treating gas stream.

The process may be better understood by reference to the attached drawing, which shows a diagrammatic representation of one form of apparatus suitable for the practice of the invention.

In the drawing hydroforming reactor 2 contains a fluid bed of catalyst 3, which has a substantially constant bed level or interface 4 separating the bed 3 from the dispersed suspension of entrained catalyst particles above this bed level. Bed 3 may be supported on a grid 5. The naphtha vapors, or other feed stock to be hydroformed, are introduced through line 6 at a point near the bottom of bed 3. Hydrogen atmosphere is maintained within the reaction zone by a hot recycle gas stream introduced through line 7 at the bottom of the reactor. Additional feed inlet points and recycle gas inlet points may be provided at other levels if desired.

The fluid catalyst in bed 3 is kept continuously mixed and violently agitated by the turbulence of the fluid state. This effect is brought about by the combined action of the rising feed vapors and recycled gas streams, which together produce a superficial velocity which is held at a suitable value within the broad range of about 0.05 to 2.0 ft./sec., depending upon the operating pressure of the process. The operating pressure in turn is chosen on the basis of catalyst activity and feed composition, to bring about the desired change. Pressures broadly within the range of 50 to 1,000 p. s. i. g. are suitable for the hydroforming process, with the lower pressures giving the highest activity at the expense of high carbon formation.

The amount of coke on the catalyst in the hydroforming reactor is controlled by continually removing a portion of the spent catalyst from bed 3, regenerating it by burning in air, and returning regenerated catalyst to the bed. The spent catalyst, which is an aliquot of the total catalyst within the reaction zone, is withdrawn as a side stream through line 8 at a rate controlled by valve 9. This spent catalyst stream may be withdrawn directly from a point within fluid bed 3. In the specific embodiment illustrated in the drawing, line 8 is shown as withdrawing catalyst from an internal stripping vessel 10 located within fluid bed 3, inside reactor 2. Catalyst enters stripper 10 through lateral inlet ports 11 opening through the side walls of the stripper at a point below bed level. A suitable stripping gas which may be steam, recycle gas, or the like, is introduced through line 12 into the bottom of stripper 10. This stripping gas flows upwardly countercurrent to the withdrawn catalyst stream, so as to remove adsorbed and occluded hydrocarbons from the spent catalyst.

Stripping vessel 10 extends upwardly beyond the level of inlet ports 11 to a point well above bed level 4, within the dispersed phase space 13 at the top of reactor 2. The upper portion 14 of stripper 10 thus serves to carry off stripping gas and stripped material into the dispersed phase space 13 so that this gas does not come directly into contact with the fluidized catalyst in the main reaction space of bed 3. The catalyst flowing to the stripper through inlet ports 11 passes down into the lower portion 15 of the stripper, which may be provided with suitable baffles 17 or other contacting device to improve the stripping action of the gas introduced countercurrently through line 12.

This arrangement makes it possible to employ as the stripping medium a gas such as steam which has a harmful effect on catalyst activity maintenance if it is introduced directly into the reaction space. The stripping gas here bypasses bed 3 entirely and is carried off from space 13 with the reaction products.

If preferred, the internal stripping vessel 10 may be omitted, and the spent catalyst withdrawn through line 8 may be stripped by means of a corresponding external stripper, not shown. In other cases it may be preferred to pass a portion or all of the spent catalyst directly to regeneration without stripping, in which case its content of adsorbed and strippable hydrocarbons will add to the heat released in regeneration. The spent catalyst in line 8, whether stripped or not, is conveyed through line 19 to regeneration vessel 20. This vessel may be located at a somewhat higher level than the top of bed 11 in reactor 10, so that regenerated catalyst can flow back into the reactor as a fluid stream under the force of gravity. The spent catalyst from line 8 may be conveyed through line 19 to vessel 20 with the aid of a carrier gas introduced through line 21. This gas may be diluted air, to initiate the combustion reaction, or it may be an inert or other oxidizing gas.

The catalyst within vessel 20 forms a fluid bed 22 having a bed level or interface 23. Additional air or oxidizing gas to complete the regeneration process may be introduced through line 24. Any suitable cooling means such as a heat exchange coil 25 may be used to abstract excess heat of regeneration from the fluid bed 22 during the combustion process. Regeneration fumes are vented from the system through line 26 after passing through a suitable solid recovery device such as cyclone separator 28 to remove entrained catalyst particles and return them to bed 22.

The rates of supply of coked catalyst and oxidizing gas to vessel 20, and the residence time of the catalyst particles therein, are controlled to approach as closely as may be desired to complete removal of coke from the catalyst particles. At the same time, the active catalytic oxide which forms an essential part of the hydroforming catalyst is oxidized to its highest valence state, which in the case of molybdenum corresponds to $MoO_3$.

The regenerated and reoxidized catalyst is withdrawn from bed 22 and through line 29 and conveyed as a dense fluid stream back to vessel 2. This stream passes downward from the regeneration vessel through a U-bend seal 30 which extends to a level below bed level 4 so as to reliably prevent any back mixing of gases from either reactor 2 or regenerator 20 into the other vessel. The rate at which regenerated catalyst flows out of vessel 20 through line 29 may be controlled by a suitable valve 31 in the riser of U-bend 30. It will be understood that while the drawing illustrates a specific apparatus in which bed level 23 in the regenerator lies above bed level 4 in the reactor, the same result can be obtained with bed 22 at a lower level, provided regenerator 20 is operating at a correspondingly higher pressure. In either case the flow of catalyst from vessel 20 to vessel 2 will be actuated by the combined effects of gravity and the static and dynamic pressure balances within the system. Also, in either case the U-bend seal 30 is designed to extend down below both bed level 4 and bed level 23 as a simple safety factor to prevent an accidental reversal in the direction of catalyst flow.

An important element of the present invention is the fact that the catalyst flowing into the reactor remains in the form of a dense suspension in an inert or oxidizing atmosphere throughout its entire path of flow until the time it enters vessel 2. Small amounts of air or an inert gas such as flue gas may be injected into line 29 and U-bend 30 as required to maintain fluidity, but no reducing or treating gas is used for this purpose.

The point of introduction at which this stream 29 of regenerated catalyst enters vessel 2 lies within a confined space constituting a stripping or conditioning zone 32 situated within vessel 2. In the specific embodiment shown the stripping zone 32 is formed by a baffle 33 extending from a point which is ordinarily below bed level 4 to a point well within the dispersed phase region 13. The regenerated catalyst stream 29 enters near the top of stripping zone 32 at a point 35, and flows downwardly therethrough toward bed 3. At a lower point within zone 32, which is so situated as to be always above bed level 4, a suitable stripping and pretreating gas is introduced through line 36. This gas, which may be a portion of the recycle gas stream, serves first to strip occluded regeneration fumes and adsorbed water from the surface of the regenerated catalyst. It serves also to partly reduce the oxidized catalyst withdrawn from regeneration vessel 20. At a given regenerated catalyst temperature, the extent of this reduction is controlled by controlling the amount of pretreating gas introduced through line 36 and the contact time of the gas and solid within zone 32. Gas rates of between about 0.5 and 1.5 ft./second with solid feed rates of from about 300 to 800 lbs./minute/sq. ft. are found to give desirable conditions of countercurrent gas and solid flow with efficient contacting and minimum entrainment.

The extent of baffle 33 above the gas inlet line 36 is designed to give the desired contact time for the stripping and treating reactions to take place, preferably between about 5 seconds and 20 seconds. Suitable baffles 38 or other contacting devices may be provided in the upper portion of zone 32, to improve the gas-solids contact in this section. The bottom part of zone 32 below the gas inlet line is kept short, to reduce the gas-solid contact time and get the desired short pretreatment. A suitable deflecting plate or baffle 39 provided at the bottom of zone 32 minimizes the direct access of reactant vapors to this zone. This baffle 39 is shown as forming a cup or seal-pot around the bottom of stripping zone 32. This serves to retain a column of solid in the short bottom portion of zone 32 at all times, preventing a disruption in the normal countercurrent flow of gas and solid through this zone in case the bed level 4 should drop below the bottom of baffle 33. The portion of the stripper below bed level 4 thus functions essentially as a standpipe directing regenerated and pretreated catalyst into bed 3 in such a way as to maintain the desired pretreating conditions and prevent the by-passing of reactor product through the pretreater.

The stripping gas introduced into zone 32, together with any small amount of aerating gas and desorbed materials, escapes upwardly from the top opening 41 into the dispersed phase region 13 at the top of the reactor 2. It combines there with the main stream of product vapors and recycle gas from bed 3. The combined stream passes through the main plant solid recovery equipment, which is shown as cyclone separators 43 and 44 equipped with dip legs 45 to return entrained solid to a point within bed 3. One advantage of this system, as indicated above, is that any entrained catalyst particles recovered from the pretreating section following their contact with the treating gas are returned to the main bed of catalyst 3. This minimizes the danger of over-reducing these particular catalyst particles by returning them to the treating zone.

The combined product and gas stream passes through line 45 to suitable product recovery equipment, not shown. A portion of this combined stream may be processed in the usual manner to recover recycle gas for use in lines 7 and 36.

The reaction of the pretreating gas in zone 32 brings about an increase in temperature in the catalyst particles due to the partial reduction of the catalytic oxide by reaction with hydrogen. The heat thus released, which may be of the order of 30 to 50° F. in the case of a molybdena catalyst, serves to heat the catalyst to a higher temperature than that at which it enters at point 35. This effect is useful to supply heat to the hydroforming reaction, provided this can be done without harm to the catalyst.

The harmful effect of the exposure of the catalyst to a temporarily elevated temperature is minimized by the short time of contact in zone 32, following which the catalyst enters directly into bed 3. The temperature of the regeneration process in vessel 20 is a matter of much more concern, since the catalyst remains at this temperature in bed 22 and in line 29 for a relatively much longer period of time. A particular advantage of the present invention is that the temperature in the regeneration vessel itself may be maintained at a temperature substantially below that which would otherwise be necessary to provide a maximum heat supply to reactor 2 as sensible heat of the regenerated catalyst. Thus, for example, a temperature rise of 50° in treating zone 32 would permit the supply of stripped and preheated regenerated catalyst to bed 3 at a temperature of 1200° F. while maintaining the regeneration temperature in vessel 20 at 1150° F. The temperature in vessel 20 may be controlled accordingly, by the use of heat exchange coil 25 or by other suitable means, so as not to exceed any desired temperature level between about 1050° F. to 1200° F. and thus to minimize the harmful effects of high temperature exposure of the catalyst.

It will be understood that while stripping zone 32 has been shown as constituted by a single baffle arranged along the side of vessel 10, the same principle may be applied to a variety of other apparatus designs wherein the stripping zone is arranged in an analogous manner within the reactor so that stripping gas passes upwardly into the dispersed phase and stripped catalyst passes downwardly directly into the fluid bed. The significance of this arrangement, combined with the feed of dense suspension of catalyst to the top of stripping zone, is that there is a short time of pretreat with a minimum of stripping gas required. This keeps the extra load on the solid separating equipment 43 to a minimum, allowing a maximum useful throughput of feed 6 and recycle gas 7 through the plant. The design shown also permits the upper portion of the pretreating zone to act as a stripper to strip out any water vapor and other products formed by the pretreating reaction.

Having thus described the invention it will be understood that the process of this invention is capable of numerous modifications, limited only by the following claims.

What is claimed is:

1. In a process for hydroforming hydrocarbons in the naphtha boiling range using a finely divided solid metal oxide hydroforming catalyst according to the fluidized solids technique, the improvement which comprises continuously withdrawing a dense fluidized stream of spent catalyst particles from a fluid bed of catalyst maintained within a reaction zone, conveying the said spent catalyst particles to a separate regeneration zone, subjecting the spent catalyst entering said regeneration zone to the action of an oxidizing gas containing excess oxygen, thereby at least partly removing from the spent catalyst carbonaceous deposits formed thereon during the hydroforming reaction, maintaining the catalyst in said regeneration zone in the form of a fluid bed, withdrawing oxidized and regenerated catalyst downwardly from said fluid bed, maintaining the stream of regenerated catalyst thus withdrawn in the dense fluid condition by the addition of only small amounts of a non-reducing aerating gas, conveying this dense fluidized stream upwardly to enter the hydroforming reactor at a point above the level of the fluid bed of hydroforming catalyst maintained therein, maintaining a stripping section at an upper level within said reactor, causing said regenerated catalyst stream to enter said stripping section and to fall therein countercurrently to a rising stream of a reducing and stripping gas present in an amount sufficient to partially reduce the oxidized catalyst and to entirely remove the water vapor formed by said partial reduction, feeding a hydrogen-containing reducing gas to said stripping section at a point above said fluid bed level, removing the stripping gas overhead out of contact with the catalyst in said fluid bed but in mixture with the vaporous reaction products from said fluid bed and passing stripped catalyst downward from said stripping zone into the main fluid bed of hydroforming catalyst.

2. In the process of reactivating a group VI metal oxide catalyst which has become spent by the deposition thereon of a carbonaceous deposit formed during use in a fluid hydroforming reaction zone, the improvement which comprises burning and heating said spent catalyst in an oxygen-containing gas, thereby removing at least part of said deposit and converting said metal oxide to its highest valence state, controlling the temperature of said burning reaction at a level below about 1200° F. by indirect heat exchange, passing a dense fluid stream of said hot oxidized catalyst downwardly into the top of a catalyst stripping zone confined within the upper part of said hydroforming reaction zone, passing upwardly into said stripping zone at an intermediate level thereof a hydrogen-containing gas for stripping and preconditioning said oxidized catalyst in an amount sufficient to partially reduce the oxidized catalyst and to entirely remove water vapor formed by said partial reduction, causing said catalyst particles to pass downward in intimate contact with and countercurrent to said rising stream of gas, thereby partly reducing said catalyst and heating it to a temperature which is above the temperature of said regeneration and below about 1200° F., removing overhead from said stripping zone the water produced by this reduction together with desorbed water and other materials stripped out of said catalyst, passing said water and desorbed materials upwardly out of said stripping zone in mixture with the vaporous hydroforming reaction products and thence out of the hydroforming reaction zone, passing the catalyst particles thus partly reduced and reactivated downwardly from said stripping zone into said hydroforming reaction zone, and continuously maintaining a bed level of the fluidized catalyst in said reaction zone at a point below the inlet of said stripping gas.

3. The process for preconditioning a regenerated hydroforming catalyst consisting essentially of a water sensitive oxide of a group VI metal of variable valence which comprises establishing a stripping zone within the upper part of a reaction zone containing a fluid bed of said hydroforming catalyst, continuously removing from said fluid bed an aliquot portion of the catalyst contained therein and conveying said portion to a regeneration zone located at a level higher than the top level of said fluid bed, subjecting the catalyst in said regeneration zone to combustion with an oxygen-containing gas, at least partly removing by said combustion process a carbonaceous deposit formed on the catalyst during the hydroforming process, simultaneously heating the catalyst and converting the group VI oxide therein to its highest valence state, passing a dense fluid stream of said hot catalyst downwardly into the top of said stripping zone, substantially at regeneration temperature, passing upwardly into the middle of said stripping zone at a level above the bed level of said catalyst a hydrogen-containing gas for stripping and preconditioning said oxidized catalyst, causing said catalyst to pass downward in intimate contact with and countercurrent to said rising stream of stripping gas, thereby partly reducing said catalyst and removing overhead from said stripping zone the water produced in this reaction together with desorbed water and other materials stripped out of said dense stream of catalyst, passing the stripped and partly reduced catalyst downwardly from the stripping zone directly into said fluid bed at a point below its upper level and withdrawing said water vapor and desorbed materials from the hydroforming reaction zone in mixture with the vaporous hydroforming reaction products at a point above said bed level.

References Cited in the file of this patent

UNITED STATES PATENTS

| | | |
|---|---|---|
| 2,366,372 | Voorhees | Jan. 2, 1945 |
| 2,367,281 | Johnson | Jan. 16, 1945 |
| 2,500,482 | Barter | Mar. 14, 1950 |
| 2,529,583 | Adams | Nov. 14, 1950 |